Patented Dec. 1, 1936

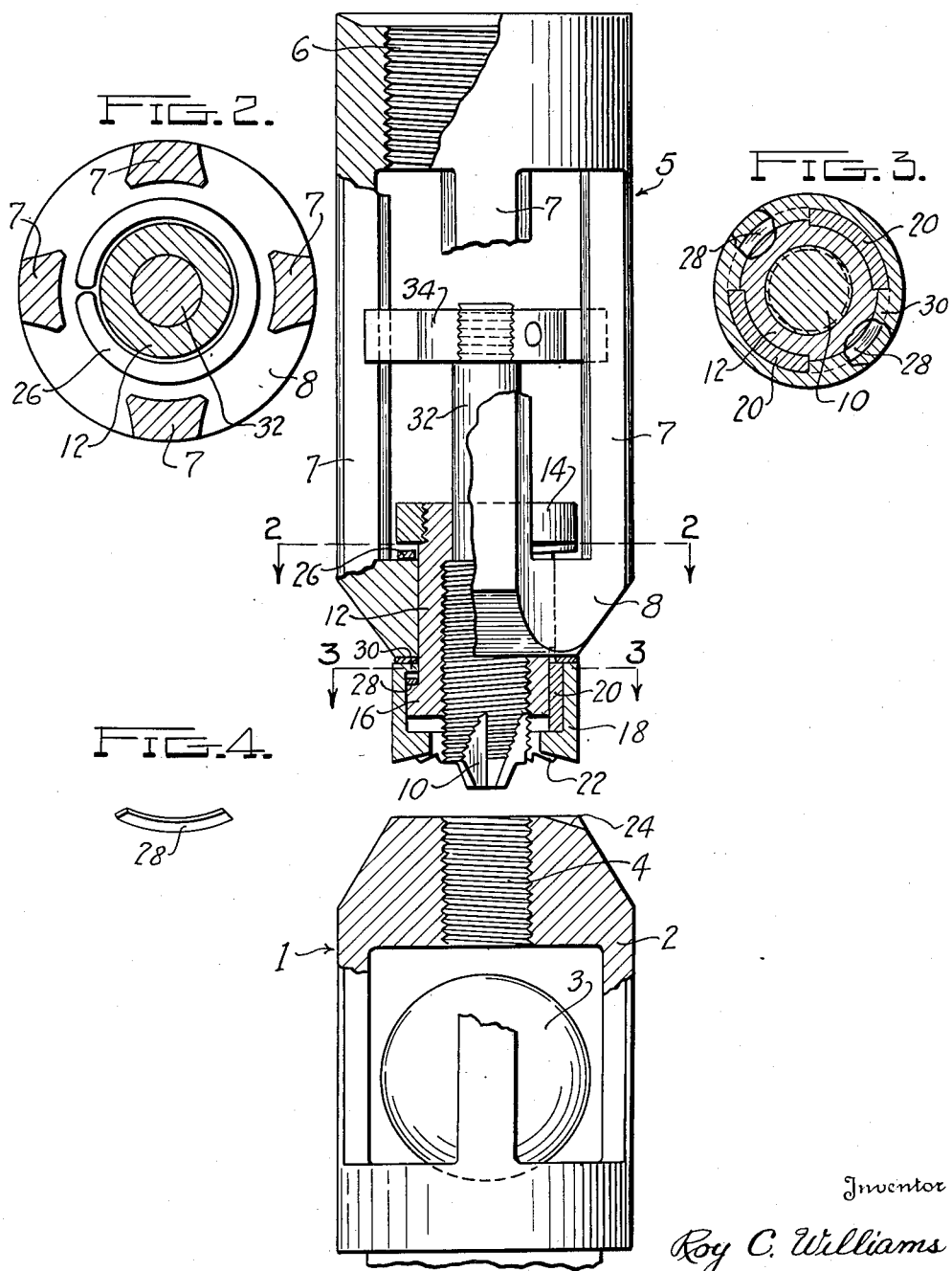

2,062,955

UNITED STATES PATENT OFFICE 2,062,955

LOWER VALVE PULLER

Roy C. Williams, Wayne, Ohio

Application March 17, 1936, Serial No. 69,343

4 Claims. (Cl. 294—86)

This invention relates to valve pulling devices and is more particularly directed to a device for use in extracting the standing lower valve of oil wells.

The present invention represents an improvement on the device shown in my prior Patent No. 1,918,578, dated July 18, 1933.

The extraction of lower standing valves from deep wells by means of a tap carried at the lower end of the traveling valve has been known and used for a considerable time. In the use of these devices, however, the threads of the tap frequently jam against the threads of the lower valve and become so deformed that the parts cannot possibly be united.

The primary object of the present invention is the provision of means to mount the tap of a valve pulling device in such a manner that it is completely shielded and completely floating with relation to its surrounding parts so that jamming of its threads against the lower valve is prevented.

Another object of the invention is the provision of opposed resilient means to float the tap relative to its surrounding structure so that the entire weight of the sucker rods in a well will be taken by the shielding members while the tap floats freely relative thereto.

Other objects and advantages of the invention will become apparent as the description proceeds, reference being had to the accompanying drawing in which—

Figure 1 is a side elevation, with parts in section and parts broken away, of a device constructed in accordance with the present invention, associated with a conventional lower valve, fragmentarily shown; Fig. 2 is a section on line 2—2 of Fig. 1; Fig. 3 is a section, with parts broken away, on line 3—3 of Fig. 1; and Fig. 4 is a detail perspective view of one of the resilient elements shown in Fig. 3.

Referring to the drawing, the conventional lower valve with which the device is associated is generally designated by 1 and includes a valve cage 2 in which a ball check valve 3 operates in the usual manner. A screw threaded perforation 4 is provided in the top of the valve cage.

The valve puller embodying the invention is generally designated by 5 and is adapted to have threaded engagement with the lower end of a conventional traveling valve by means of a threaded hole 6 in its upper end. The puller includes a cage-like structure having a plurality of longitudinal side struts 7 which merge into a lower end 8 which is bored centrally to receive the tap carrying mechanism hereinafter described.

A tap 10 is threaded into a sleeve 12 which latter is mounted for limited freely sliding movements in the lower end 8 of the puller. The upper end of the sleeve 12 is threaded to receive a retaining nut 14 and is enlarged adjacent its lower end to form a shoulder 16 extending laterally from its body portion. A shield 18 is keyed to the sleeve 12 by quarter-circular keys 20 so that the sleeve is free to reciprocate axially for a short distance with respect to the shield 18, but is prevented from rotating relative thereto.

The shield 18 is provided at its extreme lower end with a series of sharp teeth or serrations 22 which are adapted to engage the upper surface of the valve cage 2 of the lower valve. The lower valve may be provided with corresponding serrations or teeth 24, or may be smooth so that the grip of the shield is dependent upon penetration of its teeth 22 into the metallic surface of the lower valve cage.

In order to float the tap relative to the structure so far described, a circular spring 26 is provided between the retaining nut 14 and the adjacent surface of the lower end 8 of the puller so as to bias the retaining nut 14 and hence the sleeve 12 upwardly in Fig. 1. The biasing force is counteracted to a predetermined extent by quarter-circular bowed springs 28 inserted between the shoulder 16 and inturned flange 30 formed on the upper end of the shield 18. The quarter-circular springs 28 urge the sleeve 12, and hence the tap, downwardly against the action of the springs 26 so that the tap and sleeve are free to move axially a predetermined distance, generally about one-half of the pitch of the threads on the tap 10.

The tap 10 is provided with the usual shank extension 32 on which is pinned a retainer 34 having an arm for engaging certain of the struts 7 to limit the free rotative movement of the tap to less than a quarter turn. Consequently, when the puller is turned by the sucker rods or other suitable means, the tap is also turned in the same direction through the retainer 34 and its shank 32.

In operation, when it is desired to screw the tap into the threaded hole 4 of the lower valve 1, the device is lowered so that the teeth 22 of the shield 18 engage the upper surface of the lower valve cage. The shield remains stationary from this time on due to the fact that the entire weight of the rods and superposed mechanism is carried thereby, and the tap is rotated by turning the body 5 of the puller by rotating the sucker rods from a point above the well. The sleeve 12 is prevented from turning by reason of its keyed connection with the shield 18 so that the tap feeds out of the sleeve 12. If for any reason the tap threads do not properly engage the threads in the hole 4, the axial freedom provided by the springs 26 and 28 permits sufficient movement to insure proper engagement. Thus, if the lower surface of the first thread tends to rest entirely on the upper surface of the first thread in the hole 4, the tap will move upwardly against the tension of the spring 28 so that a full crest to root engagement between the threads will be had. In the event that the upper surface of the tap thread engages the lower surface of the first thread in the hole 4, the tap will move downwardly against the tension of the spring 26 and pull itself into a full crest to root engagement. It will be seen that this longitudinal movement prevents any binding of the threads of the tap and insures the intended full engagement.

It should be understood that numerous changes may be made in the construction and in the combination and arrangement of the several parts without departing from the invention as defined in the appended claims.

What I claim is:

1. In a lower valve extracting device for oil wells, a cage carried above the lower valve, a sleeve mounted for limited axial movements relative to said cage, a tap threadedly engaged in the said sleeve, a tap shield keyed to said sleeve and adapted to grip the upper surface of a lower valve, and opposed resilient means to float said sleeve relative to said shield and said cage.

2. In a lower valve extracting device for oil wells, a cage carried above the lower valve, a sleeve mounted for limited axial movements relative to said cage, a tap threadedly engaged with said sleeve, a tap shield keyed to said sleeve and adapted to grip the upper surface of a lower valve, an inturned flange formed on said shield at its upper end, a shoulder formed on the lower end of said sleeve, and a spring between said shoulder and said flange whereby the sleeve and shield are urged apart.

3. In a lower valve extracting device for oil wells, a cage carried above the lower valve, a sleeve formed for limited axial movements relative to said cage, a tap threadedly engaged with said sleeve, a tap shield keyed to said sleeve and adapted to grip the upper surface of a lower valve, an inturned flange formed on said shield, a shoulder formed on said sleeve, and a spring between said shoulder and said flange whereby the sleeve and shield are urged apart.

4. In a lower valve extracting device for oil wells, a cage carried above the lower valve, a sleeve mounted for limited axial movements relative to said cage, a tap threadedly engaged with said sleeve, a tap shield surrounding said sleeve and held against rotary movements relative thereto, resilient means adjacent the upper end of said sleeve forcing said sleeve and tap in one direction, and resilient means adjacent the lower end of said sleeve forcing the sleeve and tap in the opposite direction.

ROY C. WILLIAMS.